June 10, 1958  J. NOZAL  2,837,859
FISHING LURE
Filed Jan. 25, 1957

Joseph Nozal
INVENTOR.

BY *Clarence A. O'Brien and Harvey B. Jackson*
Attorneys

United States Patent Office 2,837,859
Patented June 10, 1958

2,837,859
FISHING LURE
Joseph Nozal, Virginia, Minn.
Application January 25, 1957, Serial No. 636,332
4 Claims. (Cl. 43—42.33)

The present invention relates to an improved fishing lure characterized by a triple-prong fish hook, a novel lure-forming head, and a resilient connection between the head and hook-equipped end portion of the aforementioned fishing hook.

More specifically, the invention pertains to a disk-like head which is characterized by a convex mirror, said head being provided centrally and on one side with an axially extending coil spring and said spring constituting a connection between the head and the hook-equipped end portion of the stated fishing hook.

An object of the invention is to improve upon similarly constructed and performing lures wherein reflecting mirrors are utilized to attract the fish, for example such prior adaptations as the Quinn fishing device Patent 581,768 of May 4, 1897, and the Lindberg fish lure 1,526,713 of February 17, 1925.

The improved construction herein disclosed employs the convex mirror for the reason that it provides the illusion of a relatively small or reduced-size minnow. In addition, the single coil spring permits the head to flex from side to side so that it can be pushed, when the bait is taken, to expose one or more of the hooks and ensuring an effective catch.

Other objects, features and advantages wil become more readily apparent from the following description and the accompanying drawing.

Figure 1:
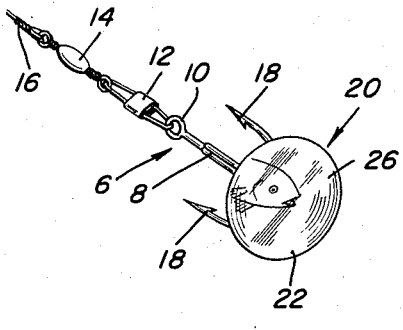
Fig. 1 is a perspective view of the improved fishing lure showing how it is constructed and functions.
Figure 2:
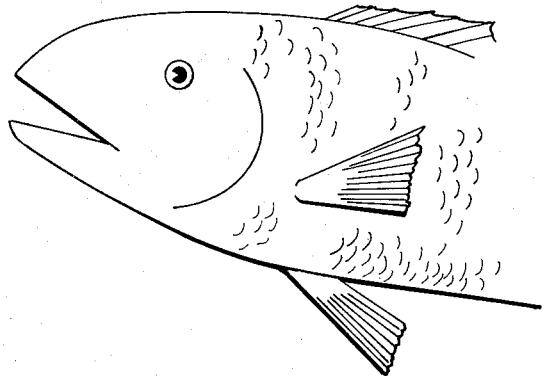
Fig. 2 is an end view of the same.
Figure 3:
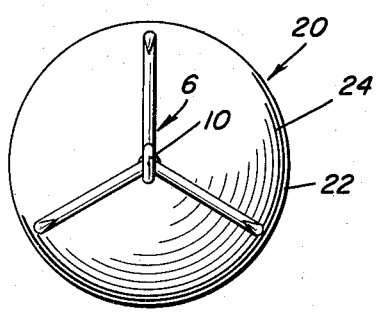
Fig. 3 is also an end view observing Fig. 4 in a direction from left to right.
Figure 4:
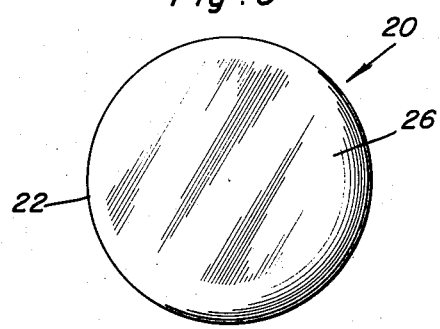
Fig. 4 is a view in section and elevation revealing the structural details and their relationship.

Referring now to the drawings and particularly to Fig. 4 the triple prong fish hook, which is conventional, is denoted by the numeral 6 and the shank is denoted at 8 and provided at one end with an eye 10 to accommodate the fastener 12 and swivel 14 to which the fishing line or leader 16 is connected in a well known manner. The barbed hooks, which are circumferentially spaced are denoted by the numerals 18. The lure takes the form of a circular or disk-like head 20 which is of a diameter to cooperate with the several barbed fish hooks 18. That is to say the marginal edge 22 occupies a position in relation to the hooks which tends to normally cover and conceal the hooks, that is in the direction of the intended movement of the victim fish in the manner shown for example in Fig. 1. Actually the head is made up of a pair of connected opposed parallel concavo-convex members 24 and 26 having their marginal edges suitably secured together. The rearmost member is formed to provide a reflecting mirror. Attached to the concave side of the mirror as at 28 and extending through an opening 30 in the member 24 and then beyond the opening is a coil spring 32. This provides a single axial attaching member which has its end portion fixedly secured at 34 in the crotch between the shank 8 and the hooks 18 of the fishing hook all as brought out satisfactorily, it is believed, in Fig. 4.

The components or parts 34 and 36 of the lure or head 20 may be made from commercial plastics and the member 26 is highly polished. When the victim fish views himself in the convex mirror 26 his image is reduced to miniature proportions and this reflects the illusion of a live bait, making the lure effective indeed. The flexibility of the shaft or spring 32 causes free movement of the mirror or head 20 so that the fish can have access to one or more of the hooks 18. When once attached the pressure of the fish's jaws against any portion of the reflector will hold the fish firmly on the hooks.

Figure 5:
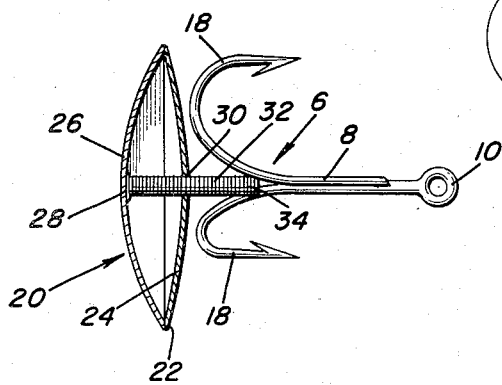
Fig. 5 is a side elevation of a modified embodiment of the invention.

Reference is had now to the modification of the invention appearing as Fig. 5. With reference thereto it will be seen that the multiple prong fish hook 6A is the same as already described. The lure in this adaptation instead of taking the form of the circular disk-like head already described comprises a spherical or ball-shaped head 38. This is preferably hollow and one side 40 of the ball is attached to and mounted on the hook means by way of an axially coiled spring 42. Although it is within the purview of the concept to utilize a ball which is, for example, made up of a suitably colored plastic material, it is preferred that the ball should be of a material which is shiny and constitutes, therefore, a reflector and corresponds with the embodiment of the invention already described. In other words, with this arrangement the ball provides an augmented mirror the reflecting surfaces of which may be effective from many different points of approach.

Minor changes in shape, size, materials and rearrangement of parts may be resorted to in actual practice without departing from the spirit of the invention or the scope of the invention as claimed.

What is claimed as new is as follows:

1. A fishing device comprising, in combination, a fish hook having a shank, at least one barbed hook and a portion having a band connecting said shank and said barbed hook, a coil spring attached at one end to an end portion of the shank and projecting rearwardly and beyond the bend of said barbed hook, and a lure head attached to and carried by the other end of said spring, said head embodying light reflecting media.

2. A fishing device comprising, in combination, a fish hook having a shank, at least one barbed hook and a portion having a band connecting said shank and said barbed hook, a coil spring attached at one end to an end portion of the shank and projecting beyond the bend of said barbed hook and a lure head attached to and carried by said spring, said head being circular in end elevation and having light reflecting surfaces provided through the medium of a convex mirror.

3. A fishing device comprising, in combination, a fish hook having a shank, at least one barbed hook and a portion having a band connecting said shank and said barbed hook, a coil spring attached at one end to an end portion of the shank and projecting beyond the bend of said barbed hook, and a lure head attached to and carried by said spring, said head being circular in end elevation and embodying light reflecting means.

4. A fishing device comprising, in combination, a fish hook having a shank, at least one barbed hook and a portion having a band connecting said shank and said barbed hook, a coil spring attached at one end to an end portion of the shank and projecting beyond the bend of said barbed hook and a lure head attached to and carried by said spring, said head being circular in end elevation and embodying light reflecting means in the form of a convex mirror.

References Cited in the file of this patent
UNITED STATES PATENTS

| | | |
|---|---|---|
| 62,042 | Lee | Feb. 12, 1867 |
| 581,768 | Quinn | May 4, 1897 |
| 1,526,713 | Lindberg | Feb. 17, 1925 |
| 2,429,568 | Stevermer | Oct. 21, 1947 |